(12) United States Patent
Konno et al.

(10) Patent No.: US 11,760,259 B2
(45) Date of Patent: Sep. 19, 2023

(54) VEHICLE APPROACH NOTIFYING DEVICE AND VEHICLE APPROACH NOTIFYING METHOD

(71) Applicant: Panasonic Intellectual Property Management Co., Ltd., Osaka (JP)

(72) Inventors: Fumiyasu Konno, Osaka (JP); Toshiya Nakagaki, Wakayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/872,513

(22) Filed: Jul. 25, 2022

(65) Prior Publication Data

US 2023/0030257 A1 Feb. 2, 2023

(30) Foreign Application Priority Data

Jul. 30, 2021 (JP) .................................. 2021-125775

(51) Int. Cl.
*B60Q 5/00* (2006.01)
(52) U.S. Cl.
CPC .................................. *B60Q 5/006* (2013.01)
(58) Field of Classification Search
CPC ......... B60Q 5/006; B60Q 5/008; G10K 15/02
See application file for complete search history.

(56) References Cited

U.S. PATENT DOCUMENTS

| 2014/0226835 | A1* | 8/2014 | Kanaya | B60Q 5/008 |
| | | | | 381/86 |
| 2016/0332565 | A1* | 11/2016 | Yamamoto | G10K 1/074 |
| 2020/0238902 | A1* | 7/2020 | Pyzik | G10K 15/02 |
| 2020/0307452 | A1* | 10/2020 | Konno | H04R 3/12 |
| 2021/0001770 | A1* | 1/2021 | Kim | G10K 11/343 |
| 2021/0138959 | A1* | 5/2021 | Soni | G08G 1/16 |
| 2021/0197717 | A1* | 7/2021 | Atsumi | G10K 15/04 |
| 2021/0300242 | A1* | 9/2021 | Konno | H04R 5/02 |

FOREIGN PATENT DOCUMENTS

| JP | 05-208636 | 8/1993 |
| JP | 11-285093 | 10/1999 |
| JP | 2014-151860 | 8/2014 |

* cited by examiner

*Primary Examiner* — Ojiako K Nwugo
(74) *Attorney, Agent, or Firm* — GREENBLUM & BERNSTEIN, P.L.C.

(57) ABSTRACT

A vehicle approach notifying device for notifying the approach of a vehicle by causing a loudspeaker to output a warning sound includes: a storage that stores a predetermined threshold of sound pressure; and a controller that: (i) causes a loudspeaker disposed outside a cabin of the vehicle to output the warning sound at a first sound pressure determined in accordance with a speed of the vehicle when a sound pressure of the warning sound acquired by a microphone disposed outside the vehicle is less than or equal to the predetermined threshold; and (ii) causes the loudspeaker to output the warning sound at a sound pressure lower than the first sound pressure when the sound pressure of the warning sound acquired by the microphone exceeds the predetermined threshold.

5 Claims, 4 Drawing Sheets

VEHICLE APPROACH NOTIFYING DEVICE AND VEHICLE APPROACH NOTIFYING METHOD

CROSS REFERENCE TO RELATED APPLICATION

The present application is based on and claims priority of Japanese Patent Application No. 2021-125775 filed on Jul. 30, 2021.

FIELD

The present disclosure relates to a vehicle approach notifying device and a vehicle approach notifying method which output a warning sound for notifying the outside that the vehicle is approaching.

BACKGROUND

Electric vehicles and hybrid vehicles produce low noise, and therefore during low-speed traveling of such a vehicle with low roadway noise, a pedestrian or the like is unlikely to notice the approach of the vehicle, which has been problematic. Thus, as disclosed in Patent Literature (PTL) 1 and 2, there is known, for low-noise vehicles such as electric vehicles and hybrid vehicles, a vehicle approach notifying device that generates a warning sound, which is a continuous sound associated with a vehicle in a traveling state, when traveling to alert a pedestrian or the like to the approach of the vehicle.

CITATION LIST

Patent Literature

PTL 1: Japanese Unexamined Patent Publication No. 5-208636
PTL 2: Japanese Unexamined Patent Publication No. 11-285093

SUMMARY

However, the vehicle approach notifying devices according to PTL 1 and 2 can be improved upon.

In view of this, the present disclosure provides a vehicle approach notifying device and a vehicle approach notifying method capable of improving upon the above related art.

A vehicle approach notifying device according to one aspect of the present disclosure is a vehicle approach notifying device for notifying the approach of a vehicle by causing a loudspeaker to output a warning sound, the device including: a storage that stores a predetermined threshold of sound pressure; and a controller that: (i) causes a loudspeaker disposed outside a cabin of the vehicle to output the warning sound at a first sound pressure determined in accordance with a speed of the vehicle when the sound pressure of the warning sound acquired by a microphone disposed outside the vehicle is less than or equal to the predetermined threshold; and (ii) causes the loudspeaker to output the warning sound at a sound pressure lower than the first sound pressure when the sound pressure of the warning sound acquired by the microphone exceeds the predetermined threshold.

Note that general or specific aspects may be achieved by a system, method, integrated circuit, computer program, or a recording medium such as a computer-readable compact disc read-only memory (CD-ROM), or by any combination of a system, a method, an integrated circuit, a computer program, and a recording medium.

The vehicle approach notifying device according to one aspect of the present disclosure can further improve upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
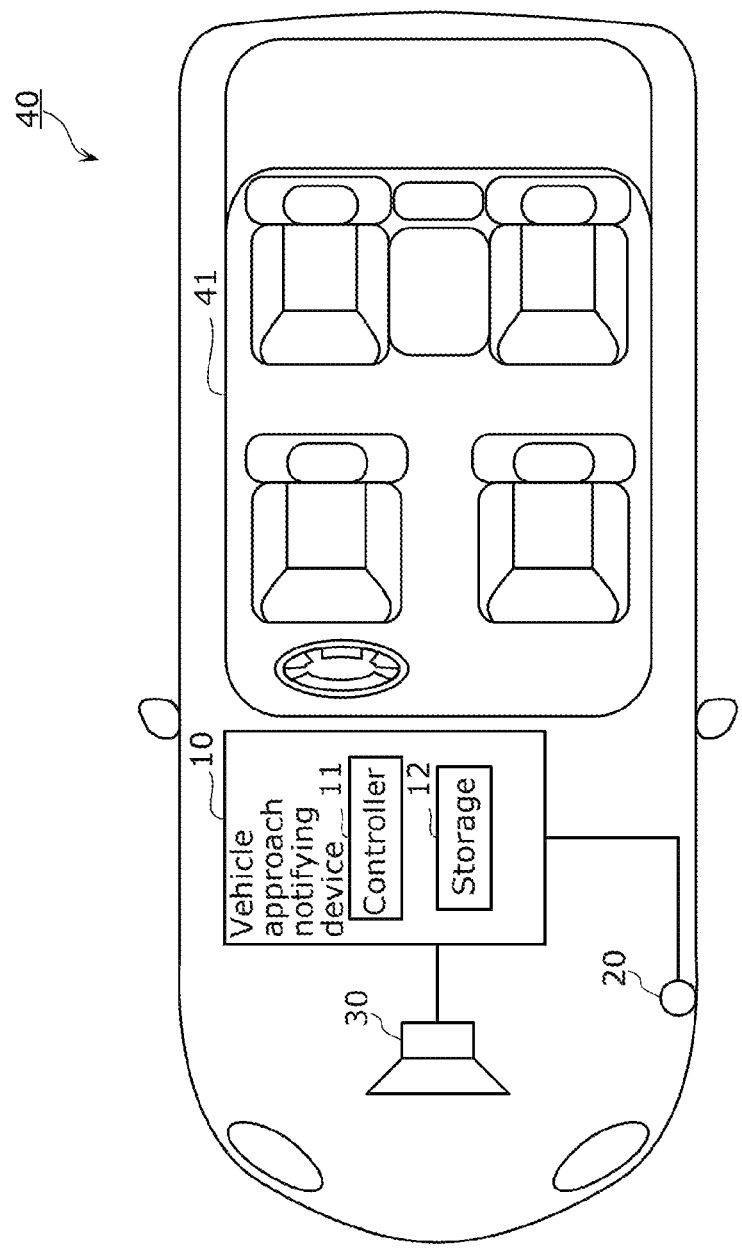
FIG. 1 is a schematic diagram of a vehicle equipped with a vehicle approach notifying device according to an embodiment.

Underlying Knowledge Forming Basis of the Present Disclosure

With the vehicle approach notifying devices disclosed in PTL 1 and 2, when a warning sound is emitted to the outside of the vehicle, the warning sound may be larger than expected in an environment where the warning sound is likely to echo.

Accordingly, the present disclosure provides a vehicle approach notifying device capable of reducing a warning sound emitted to the outside of a vehicle so as not to become a sound louder than expected.

A vehicle approach notifying device according to one aspect of the present disclosure is a vehicle approach notifying device for notifying the approach of a vehicle by causing a loudspeaker to output a warning sound, the device including: a storage that stores a predetermined threshold of sound pressure; and a controller that: (i) causes a loudspeaker disposed outside a cabin of the vehicle to output the warning sound at a first sound pressure determined in accordance with a speed of the vehicle when the sound pressure of the warning sound acquired by a microphone disposed outside the vehicle is less than or equal to the predetermined threshold; and (ii) causes the loudspeaker to output the warning sound at a sound pressure lower than the first sound pressure when the sound pressure of the warning sound acquired by the microphone exceeds the predetermined threshold.

According to the above, using the sound pressure of the warning sound acquired by the microphone makes it possible to determine that the warning sound having a sufficient sound pressure is being generated from the vehicle even when the warning sound from the loudspeaker is set to a sound pressure lower than the first sound pressure determined in accordance with the speed of the vehicle. Thus, in a case where the sound pressure of the warning sound emitted from the vehicle is sufficient, it is possible to reduce the sound pressure of the warning sound output from the loudspeaker while ensuring the necessary sound pressure. This enables a reduction in power consumption required for outputting the warning sound.

The controller may extract, as the warning sound, a sound in a predetermined frequency band from the sound acquired by the microphone, and the controller may: (i) cause a loudspeaker disposed outside the cabin of the vehicle to output the warning sound at the first sound pressure when the sound pressure of the extracted warning sound is less than or equal to the predetermined threshold; and (ii) cause the loudspeaker to output the warning sound at a sound pressure lower than the first sound pressure when the sound pressure of the extracted warning sound exceeds the predetermined threshold.

Hence it is possible to extract a warning sound from the sound acquired by the microphone and to determine, based on the sound pressure of the extracted warning sound, whether or not to adjust the sound pressure of the warning sound output from the loudspeaker to be lower.

When the sound pressure of the warning sound acquired by the microphone exceeds the predetermined threshold, the controller may lower the sound pressure of the warning sound to make the sound pressure of the warning sound equal to the predetermined threshold.

Therefore, even when the sound pressure of the warning sound output from the loudspeaker is reduced in the case where the sound pressure of the warning sound emitted from the vehicle is sufficient, the necessary sound pressure can be ensured.

The predetermined threshold may be a threshold for guaranteeing that when the sound pressure of the sound acquired by the microphone exceeds the predetermined threshold, the loudspeaker is outputting a warning sound having a sound pressure that causes a sound having a sound pressure greater than or equal to a specified sound pressure to be measured at a specified position outside the vehicle.

Therefore, even when the sound pressure of the warning sound output from the loudspeaker is reduced in the case where the sound pressure of the warning sound emitted from the vehicle is sufficient, the specified sound pressure can be ensured.

Also, a vehicle approach notifying method according to one aspect of the present disclosure is a vehicle approach notifying method performed by a vehicle approach notifying device that notifies the approach of a vehicle by causing a loudspeaker to output a warning sound, the method including: acquiring sound from a microphone disposed outside the vehicle; and (i) causing a loudspeaker disposed outside a cabin of the vehicle to output the warning sound at a first sound pressure determined in accordance with a speed of the vehicle when a sound pressure of the warning sound acquired by the microphone is less than or equal to the predetermined threshold, and (ii) causing the loudspeaker to output the warning sound at a sound pressure lower than the first sound pressure when the sound pressure of the warning sound acquired by the microphone exceeds the predetermined threshold.

According to the above, using the sound pressure of the warning sound acquired by the microphone makes it possible to determine that the warning sound having a sufficient sound pressure is being generated from the vehicle even when the warning sound from the loudspeaker is set to a sound pressure lower than the first sound pressure determined in accordance with the speed of the vehicle. Thus, in a case where the sound pressure of the warning sound emitted from the vehicle is sufficient, it is possible to reduce the sound pressure of the warning sound output from the loudspeaker while ensuring the necessary sound pressure. This enables a reduction in power consumption required for outputting the warning sound.

Note that the above general or specific aspects may be achieved by a system, method, integrated circuit, computer program, or a recording medium such as a computer-readable compact disc read-only memory (CD-ROM), or by any combination of the system, method, integrated circuit, computer program, and recording medium.

An exemplary embodiment of the present disclosure will be described below with reference to the drawings. Note that the embodiment described below shows a specific example of the present disclosure. Numerical values, shapes, materials, components, placement positions and connection forms of components, steps, order of steps, and the like shown in the following embodiment are examples and are not intended to limit the present disclosure. In addition, among the components in the following embodiment, components not described in the independent claims each showing the broadest concept will be described as optional components.

EMBODIMENT

In an embodiment, a vehicle approach notifying device mounted on a vehicle will be described.

FIG. 1 is a schematic diagram of a vehicle equipped with a vehicle approach notifying device according to an embodiment.

Vehicle 40 is an example of a mobile apparatus and is equipped with vehicle approach notifying device 10, microphone 20, and loudspeaker 30. Vehicle 40 is specifically an automobile but is not limited thereto.

Microphone 20 is disposed outside cabin 41 of vehicle 40 and acquires sound around vehicle 40. Microphone 20 acquires sound outside cabin 41. Microphone 20 outputs an audio signal corresponding to the acquired sound.

Loudspeaker 30 outputs a sound in accordance with the audio signal output from vehicle approach notifying device 10. Loudspeaker 30 is disposed outside the cabin of vehicle 40, for example, in an engine compartment or the like. Loudspeaker 30 thus outputs a warning sound for notifying the approach of vehicle 40 to the outside of vehicle 40. Loudspeaker 30 has a function of converting an electric signal, which is an audio signal, into mechanical vibration and outputs a warning sound having a sound pressure based on the electric signal.

Note that cabin 41 of vehicle 40 is a space into which the occupant of vehicle 40 enters. In other words, cabin 41 is a space in which the occupant of vehicle 40 is present.

[1. Configuration]

Figure 2:
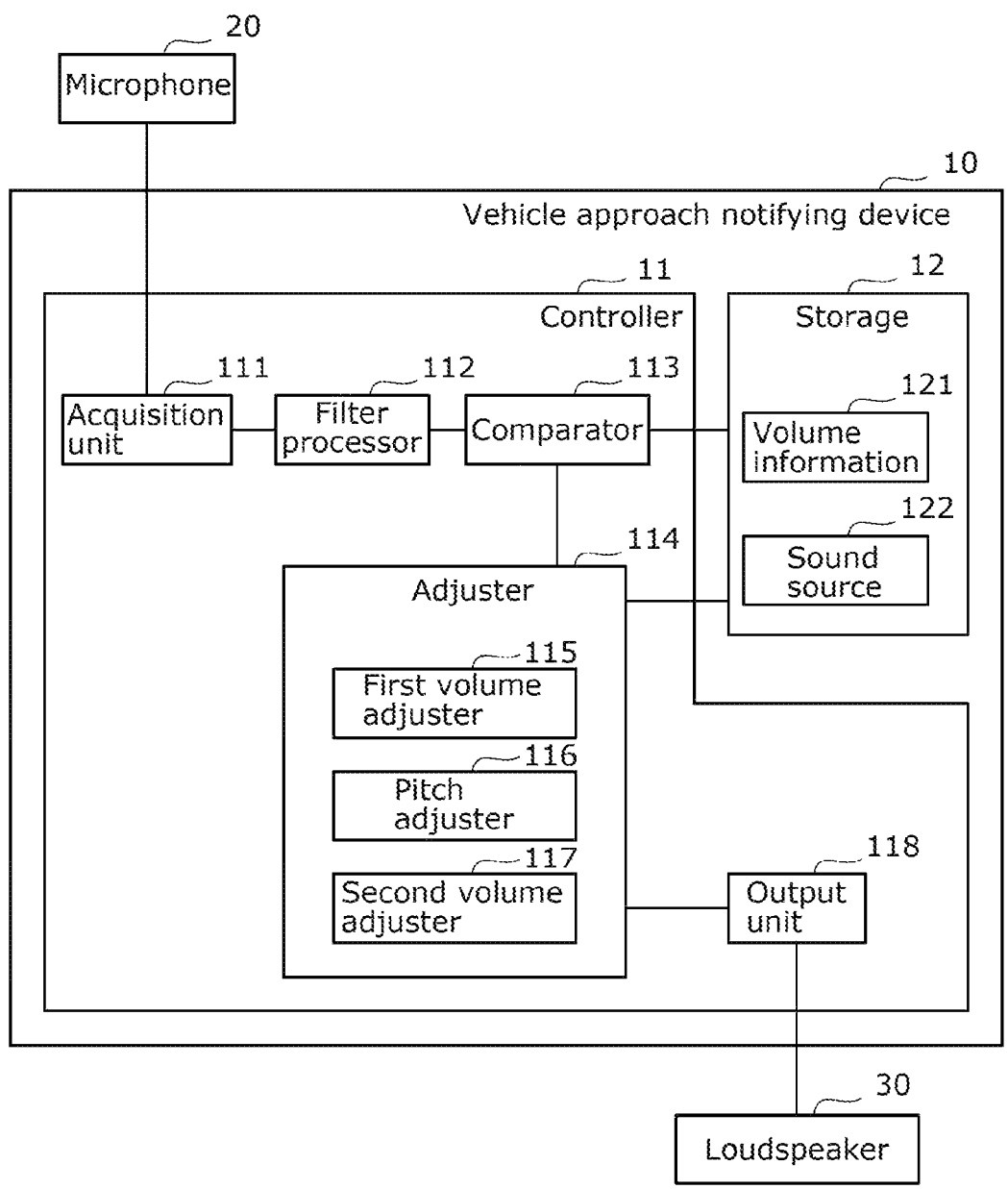
FIG. 2 is a functional block diagram of the vehicle approach notifying device.

Next, the configuration of vehicle approach notifying device 10 will be described with reference to FIG. 2 in addition to FIG. 1. FIG. 2 is a functional block diagram of vehicle approach notifying device 10.

Vehicle approach notifying device 10 is a device for notifying people around vehicle 40 of the approach of vehicle 40 by causing loudspeaker 30 to output a warning sound.

As illustrated in FIGS. 1 and 2, vehicle approach notifying device 10 includes controller 11 and storage 12. When the sound pressure of the sound acquired by microphone 20 exceeds a predetermined threshold, controller 11 makes the sound pressure of the sound output by loudspeaker 30 lower than when the sound pressure of the sound does not exceed the predetermined threshold. Controller 11 is achieved by, for example, a processor such as a digital signal processor (DSP), but may be achieved by a microcomputer or a dedicated circuit or may be achieved by a combination of two or more of the processor, microcomputer, and dedicated circuit.

As illustrated in FIG. 2, controller 11 includes acquisition unit 111, filter processor 112, comparator 113, adjuster 114, and output unit 118. Each component will be described below with reference to FIGS. 1 to 3.

Acquisition unit 111 acquires an audio signal from microphone 20. Acquisition unit 111 is specifically a circuit including an amplifier circuit for amplifying an audio signal acquired from microphone 20, or some other circuit. Note that a specific mode of acquisition unit 111 is not limited to the above.

Filter processor 112 performs predetermined filter processing on the audio signal acquired by acquisition unit 111. Filter processor 112 specifically uses a combination of a low-pass filter and a high-pass filter to extract an audio signal having a frequency characteristic of a predetermined frequency band. Filter processor 112 may use a bandpass filter to extract an audio signal having the frequency characteristic of the predetermined frequency band. The range of the frequency of the audio signal extracted by filter processor 112 is, for example, from 160 Hz to 500 Hz. In this manner, filter processor 112 may filter the sound acquired by microphone 20 to extract a sound in the predetermined frequency band as a warning sound out of the sound generated from vehicle 40.

Comparator 113 compares the sound pressure of the sound in the predetermined frequency band extracted by filter processor 112 with a predetermined threshold indicated by volume information 121 stored in storage 12. That is, comparator 113 determines whether or not the sound pressure of the sound in the predetermined frequency band exceeds the predetermined threshold and outputs the determination result to adjuster 114. The predetermined threshold is a threshold determined in advance by measuring sound being generated from vehicle 40 at a specified position around vehicle 40 and is set to a value at which the sound pressure of the measured sound exceeds a specified sound pressure.

The National Highway Traffic Safety Administration (NHTSA) of North America is studying the specification of the minimum sound pressure value for warning sounds output from low-noise vehicles such as electric vehicles and hybrid vehicles. For example, the minimum sound pressure value is specified for each of eight frequency bands of one-third octaves, and when the measurement is performed by a predetermined measuring method, a warning sound greater than or equal to the minimum sound pressure value needs to be output. The sound pressure of the warning sound cannot thus be made lower than the minimum sound pressure value. Hence there is a need for a technique that reduces discomfort to the occupant while outputting a warning sound greater than or equal to the minimum sound pressure value.

Comparator 113 may perform the following processing for each of a plurality of frequencies different from each other in a predetermined frequency band of a sound in a predetermined range. Comparator 113 specifically analyzes the sound in the predetermined range to start the following processing for sound pressures at 160 Hz, 200 Hz, 250 Hz, 315 Hz, 400 Hz, and 500 Hz, Note that the plurality of frequencies to be used for the determination by comparator 113 only need to be included in the predetermined frequency band or may be included in a frequency band outside the predetermined frequency band. The plurality of frequencies are frequencies determined by division into frequency bands at one-third octave intervals. The plurality of frequencies include at least a frequency within a frequency band of a one-third octave from the lowest frequency of the predetermined frequency band and a frequency within a frequency band of a one-third octave from the highest frequency of the predetermined frequency band. In other words, the plurality of frequencies are frequencies that can be specified by evenly dividing the predetermined frequency band at one-third octave intervals.

Comparator 113 determines whether or not the sound pressure at one of the plurality of frequencies exceeds the predetermined threshold. When determining that the sound pressure at one frequency exceeds the predetermined threshold, comparator 113 stores information indicating that the sound pressure at the one frequency is "high". That is, in this case, comparator 113 stores information indicating that the sound pressure exceeds the predetermined threshold as information indicating that the sound pressure at the one frequency is "high".

On the other hand, when determining that the sound pressure at one frequency does not exceed the predetermined threshold, comparator 113 stores information indicating that the sound pressure at the one frequency is "low". That is, in this case, comparator 113 stores information indicating that the sound pressure does not exceed the predetermined threshold as information indicating that the sound pressure at the one frequency is "low".

Comparator 113 repeats the above processing for the sound pressure at the next frequency for which the determination processing has not yet been performed, among the sound pressures at the plurality of frequencies. When the above processing is performed for the sound pressures at all the frequencies, comparator 113 ends the processing and ends the comparison processing.

Although it has been described that comparator 113 repeats the above processing for the sound pressure with each of the plurality of frequencies, this is not restrictive, and comparator 113 may determine whether or not the maximum value of the sound pressure in the predetermined frequency band exceeds the predetermined threshold Th1.

Adjuster 114 adjusts the sound pressure and pitch of the warning sound output from loudspeaker 30 in accordance with the comparison result of comparator 113. Adjuster 114 includes first volume adjuster 115, pitch adjuster 116, and second volume adjuster 117.

First volume adjuster 115 determines the sound pressure of the warning sound output from loudspeaker 30 to be a first sound pressure in accordance with the speed of vehicle 40. First volume adjuster 115 may determine the first sound pressure such that the higher the speed of vehicle 40, the lower the sound pressure. The speed of vehicle 40 is acquired from vehicle 40.

Pitch adjuster 116 adjusts the pitch of the warning sound output from loudspeaker 30 in accordance with the speed of vehicle 40. First volume adjuster 115 may adjust the pitch such that the higher the speed of vehicle 40, the higher the sound pressure. The speed of vehicle 40 is acquired from vehicle 40.

When the result of the determination by comparator 113 indicates that the sound pressure of the sound in the predetermined frequency band exceeds the predetermined threshold, second volume adjuster 117 adjusts the sound pressure of the warning sound output from loudspeaker 30 to a sound pressure lower than the first sound pressure determined by first volume adjuster 115. When the sound pressure of the warning sound acquired by microphone 20 exceeds the predetermined threshold, second volume adjuster 117 performs feedback control such that the sound pressure of the warning sound acquired by microphone 20 reaches the predetermined threshold, thereby making the sound pressure of the warning sound output from loudspeaker 30 lower than the first sound pressure. When the result of the determination by comparator 113 indicates that the sound pressure of the sound in the predetermined frequency band does not exceed the predetermined threshold, second volume adjuster 117 does not adjust the sound pressure of the warning sound output from loudspeaker 30 but maintains the first sound pressure determined by first volume adjuster 115.

Output unit 118 causes loudspeaker 30 to output a warning sound at the sound pressure and the pitch adjusted by adjuster 114. Output unit 118 may, for example, amplify an audio signal such that the sound pressure is the sound pressure adjusted by adjuster 114, and output the amplified audio signal to loudspeaker 30, Output unit 118 may be achieved by, for example, an amplifier circuit.

Storage 12 stores volume information 121 and sound source 122.

Volume information 121 includes a predetermined threshold. The predetermined threshold is a threshold for guaranteeing that when the sound pressure of the sound acquired by the microphone exceeds the predetermined threshold, loudspeaker 30 is outputting a warning sound having a sound pressure greater than or equal to a specified sound pressure at a specified position outside vehicle 40. The predetermined threshold may include different thresholds determined respectively for the plurality of frequency bands. That is, for each of the plurality of frequency bands included in the predetermined frequency band of the sound extracted by filter processor 112, comparator 113 may compare the sound pressure in the frequency band with the threshold defined by the frequency band.

Sound source 122 is an audio signal corresponding to one warning sound for notifying the outside that vehicle 40 is approaching. The warning sound is, for example, an engine sound. Sound source 122 may be a pseudo engine sound or an electronic sound and may contain, for example, frequency components in a low-pitched sound part of 300 Hz to 800 Hz and a high-pitched sound part of 1 kHz to 5 kHz, for example, Note that the warning sound output from sound source 122 may be a simple sinusoidal signal sound or the like.

[2. Operation]

Figure 3:
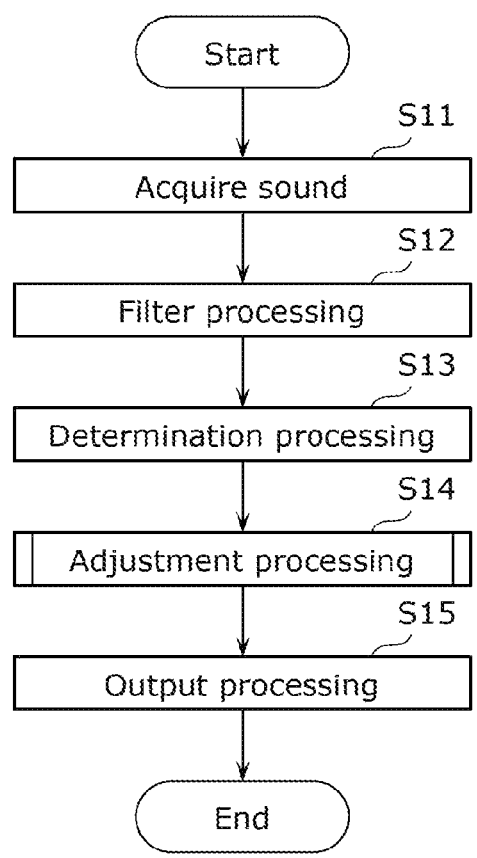
FIG. 3 is a flowchart of the operation of the vehicle approach notifying device.

Next, the operation of vehicle approach notifying device 10 will be described,

FIG. 3 is a flowchart of the operation of the vehicle approach notifying device.

Vehicle approach notifying device 10 acquires an audio signal from microphone 20 (S11). Step S11 is processing performed by acquisition unit 111.

Next, vehicle approach notifying device 10 performs predetermined filter processing on the acquired voice signal (S12). Step S12 is processing performed by filter processor 112.

Subsequently, vehicle approach notifying device 10 compares the sound pressure of the extracted sound in the predetermined frequency band with a predetermined threshold indicated by volume information 121 stored in storage 12 (S13). Step S13 is processing performed by comparator 113.

Next, vehicle approach notifying device 10 adjusts the sound pressure and pitch of the warning sound output from loudspeaker 30 in accordance with the comparison result (determination result) in step S13 (S14), Step S14 is processing performed by adjuster 114.

Then, vehicle approach notifying device 10 causes loudspeaker 30 to output a warning sound at the adjusted sound pressure and pitch (S15). Step S15 is processing performed by output unit 118.

Figure 4:
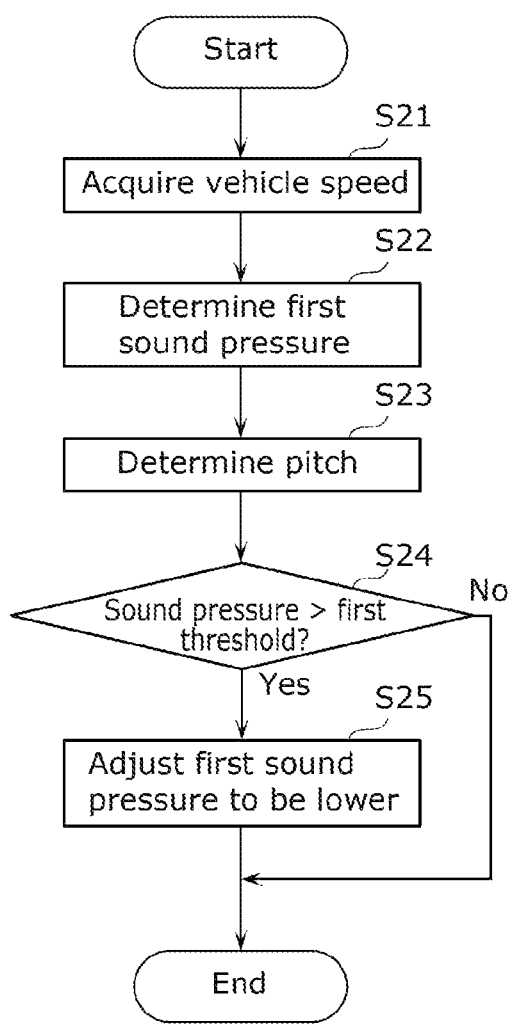
FIG. 4 is a flowchart of adjustment processing.

FIG. 4 is a flowchart of the adjustment processing in step S14.

Vehicle approach notifying device 10 acquires a vehicle speed from vehicle 40 (S21).

Next, vehicle approach notifying device 10 determines the sound pressure of the warning sound output from loudspeaker 30 as a first sound pressure in accordance with the acquired vehicle speed (S22). Step S22 is processing performed by first volume adjuster 115.

Subsequently, vehicle approach notifying device 10 adjusts the pitch of the warning sound output from loudspeaker 30 in accordance with the speed of vehicle 40 (S23). Step S23 is processing performed by pitch adjuster 116.

Next, when the determination result indicates that the sound pressure of the sound in the predetermined frequency band exceeds the predetermined threshold (Yes in S24), vehicle approach notifying device 10 adjusts the sound pressure of the warning sound output from loudspeaker 30 to a sound pressure lower than the first sound pressure determined by first volume adjuster 115 (S25).

On the other hand, when the determination result indicates that the sound pressure of the sound in the predetermined frequency band does not exceed the predetermined threshold (Yes in S25), vehicle approach notifying device 10 does nothing and ends the processing. That is, in this case, vehicle approach notifying device 10 does not adjust the sound pressure of the warning sound output from loudspeaker 30 but maintains the first sound pressure determined by first volume adjuster 115.

Each of steps S24 and S25 is processing performed by second volume adjuster 117.

[3. Effects, Etc.]

Vehicle approach notifying device 10 according to the present embodiment notifies the approach of vehicle 40 by causing loudspeaker 30 to output a warning sound. Vehicle approach notifying device 10 includes storage 12 and controller 11. Storage 12 stores a predetermined threshold of sound pressure. When the sound pressure of a warning sound acquired by microphone 20 disposed outside vehicle 40 is less than or equal to the predetermined threshold, controller 11 causes loudspeaker 30 disposed outside cabin 41 of vehicle 40 to output the warning sound at a first sound pressure determined in accordance with the speed of vehicle 40. When the sound pressure of the sound acquired by microphone 20 exceeds the predetermined threshold, controller 11 causes loudspeaker 30 to output a warning sound at a sound pressure lower than the first sound pressure.

According to the above, using the sound pressure of the warning sound acquired by microphone 20 makes it possible to determine that the warning sound having a sufficient sound pressure is being generated from vehicle 40 even when the warning sound from loudspeaker 30 is set to a sound pressure lower than the first sound pressure determined in accordance with the speed of vehicle 40, Thus, in a case where the sound pressure of the warning sound emitted from vehicle 40 is sufficient, it is possible to reduce the sound pressure of the warning sound output from loudspeaker 30 while ensuring the necessary sound pressure. This enables a reduction in power consumption required for outputting the warning sound.

In vehicle approach notifying device 10 according to the present embodiment, controller 11 extracts a sound in a predetermined frequency band as a warning sound from the sound acquired by microphone 20. When the sound pressure of the extracted warning sound is less than or equal to the predetermined threshold, controller 11 causes loudspeaker 30 disposed outside cabin 41 of vehicle 40 to output the warning sound at the first sound pressure. When the sound pressure of the extracted warning sound exceeds the predetermined threshold, controller 11 causes loudspeaker 30 to output the warning sound at a sound pressure lower than the first sound pressure.

Hence it is possible to extract a warning sound from the sound acquired by microphone 20 and to determine, based on the sound pressure of the extracted warning sound, whether or not to adjust the sound pressure of the warning sound output from loudspeaker 30 to be lower.

In vehicle approach notifying device 10 according to the present embodiment, when the sound pressure of the warning sound acquired by microphone 20 exceeds the predetermined threshold, controller 11 lowers the sound pressure of the warning sound to make the sound pressure of the warning sound equal to the predetermined threshold. Therefore, even when the sound pressure of the warning sound output from loudspeaker 30 is reduced in the case where the sound pressure of the warning sound emitted from vehicle 40 is sufficient, the necessary sound pressure can be ensured.

In vehicle approach notifying device 10 according to the present embodiment, the predetermined threshold is a threshold for guaranteeing that when the sound pressure of the warning sound acquired by microphone 20 exceeds the predetermined threshold, loudspeaker 30 is outputting a warning sound having a sound pressure that causes a sound having a sound pressure greater than or equal to a specified sound pressure to be measured at a specified position outside vehicle 40. Therefore, even when the sound pressure of the warning sound output from loudspeaker 30 is reduced in the case where the sound pressure of the warning sound emitted from vehicle 40 is sufficient, the specified sound pressure can be ensured.

[4. Others]

In the above embodiment, each of the components may be formed of dedicated hardware or may be achieved by executing a software program suitable for each of the components. Each of the components may be achieved by a program executor, such as a central processing unit (CPU) or a processor, reading and executing a software program recorded on a recording medium, such as a hard disk or a semiconductor memory.

Each of the components may be a circuit (or an integrated circuit). These circuits may constitute a single circuit as a whole or may be separate circuits. These circuits may each be a general-purpose circuit or a dedicated circuit.

Also, the general or specific aspects of the present disclosure may be achieved by a system, device, method, integrated circuit, computer program, or a non-temporary recording medium such as a computer-readable CD-ROM. The general or specific aspects of the present disclosure may also be achieved by any combination of the system, device, method, integrated circuit, computer program, and computer-readable non-temporary recording medium.

For example, the present disclosure may be achieved as a vehicle approach notifying method performed by a vehicle approach notifying device (computer or DSP) or may be achieved as a program for causing a computer or DSP to perform the vehicle approach notifying method.

In the above embodiment, processing performed by a specific processor may be performed by another processor. The order of the plurality of pieces of processing in the operation of the vehicle approach notifying device described in the above embodiment may be changed, or the plurality of pieces of processing may be performed in parallel.

In addition, the present disclosure &so includes forms obtained by application of various modifications conceivable by one skilled in the art to the foregoing embodiments, or forms achieved by any combination of the components and functions of the embodiments, without departing from the spirit of the present disclosure.

While exemplary embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following patent application including specification, drawings, and claims are incorporated herein by reference in their entirety: Japanese Patent Application No. 2021-125775 filed on Jul. 30, 2021.

INDUSTRIAL APPLICABILITY

The present disclosure can be applied to vehicle approach notifying devices provided on low-noise vehicles such as electric vehicles or hybrid vehicles.

The invention claimed is:

1. A vehicle approach notifying device that notifies approach of a vehicle by causing a loudspeaker to output a warning sound, the vehicle approach notifying device comprising:
    a storage that stores a predetermined threshold of sound pressure; and
    a controller that:
        (i) causes a loudspeaker disposed outside a cabin of the vehicle to output the warning sound at a first sound pressure determined in accordance with a speed of the vehicle when a sound pressure of the warning sound acquired by a microphone disposed outside the vehicle is less than or equal to the predetermined threshold; and
        (ii) causes the loudspeaker to output the warning sound at a sound pressure lower than the first sound pressure when the sound pressure of the warning sound acquired by the microphone exceeds the predetermined threshold.

2. The vehicle approach notifying device according to claim 1, wherein
    the controller extracts, as the warning sound, a sound in a predetermined frequency band from a sound acquired by the microphone, and
    the controller:
        (i) causes the loudspeaker to output the warning sound at the first sound pressure when the sound pressure of the warning sound extracted is less than or equal to the predetermined threshold; and
        (ii) causes the loudspeaker to output the warning sound at a sound pressure lower than the first sound pressure when the sound pressure of the extracted warning sound exceeds the predetermined threshold.

3. The vehicle approach notifying device according to claim 1, wherein
    when the sound pressure of the warning sound acquired by the microphone exceeds the predetermined threshold, the controller lowers the sound pressure of the warning sound to make the sound pressure of the warning sound equal to the predetermined threshold.

4. The vehicle approach notifying device according to claim 1, wherein
the predetermined threshold is a threshold for guaranteeing that when a sound pressure of a sound acquired by the microphone exceeds the predetermined threshold, the loudspeaker is outputting a warning sound having a sound pressure that causes a sound having a sound pressure greater than or equal to a specified sound pressure to be measured at a specified position outside.

5. A vehicle approach notifying method performed by a vehicle approach notifying device that notifies approach of a vehicle by causing a loudspeaker to output a warning sound, the vehicle approach notifying method comprising:
acquiring sound from a microphone disposed outside the vehicle; and
(i) causing a loudspeaker disposed outside a cabin of the vehicle to output the warning sound at a first sound pressure determined in accordance with a speed of the vehicle when a sound pressure of the warning sound acquired by the microphone is less than or equal to the predetermined threshold, and
(ii) causing the loudspeaker to output the warning sound at a sound pressure lower than the first sound pressure when the sound pressure of the warning sound acquired by the microphone exceeds the predetermined threshold.

\* \* \* \* \*